US012397385B2

(12) United States Patent
Iwamoto et al.

(10) Patent No.: US 12,397,385 B2
(45) Date of Patent: Aug. 26, 2025

(54) BOLT FEEDER

(71) Applicant: DENGENSHA TOA CO., LTD., Kawasaki (JP)

(72) Inventors: Yoshiaki Iwamoto, Kanagawa (JP); Toshiyuki Ogata, Kanagawa (JP); Yoshihiro Arai, Kanagawa (JP)

(73) Assignee: DENGENSHA TOA CO., LTD., Kanagawa (JP)

( * ) Notice: Subject to any disclaimer, the term of this patent is extended or adjusted under 35 U.S.C. 154(b) by 381 days.

(21) Appl. No.: 17/998,659

(22) PCT Filed: Mar. 29, 2021

(86) PCT No.: PCT/JP2021/013263
§ 371 (c)(1),
(2) Date: Nov. 12, 2022

(87) PCT Pub. No.: WO2021/229936
PCT Pub. Date: Nov. 18, 2021

(65) Prior Publication Data
US 2023/0347459 A1    Nov. 2, 2023

(30) Foreign Application Priority Data
May 13, 2020   (JP) ................ 2020-084230

(51) Int. Cl.
*B65G 47/80* (2006.01)
*B23P 19/00* (2006.01)

(52) U.S. Cl.
CPC ........... *B23P 19/002* (2013.01); *B23P 19/003* (2013.01)

(58) Field of Classification Search
CPC ....... B65G 47/28; B65G 47/80; B23P 19/002; B23P 19/003
(Continued)

(56) References Cited

U.S. PATENT DOCUMENTS 3,065,841 A * 11/1962 Stover .................. B67B 3/0645
221/160
4,047,636 A *  9/1977 List .................... B65G 47/1492
198/398
(Continued)

FOREIGN PATENT DOCUMENTS

JP    60-151822 U1   10/1985
JP     5-43277 U1    6/1993
(Continued)

OTHER PUBLICATIONS

Japan Patent Office, International Search Report, Jun. 22, 2021, issued in corresponding application PCT/JP2021/013263 (5 pages).

*Primary Examiner* — Douglas A Hess
(74) *Attorney, Agent, or Firm* — Capitol City TechLaw, PLLC; Samuel P Burkholder

(57) ABSTRACT

A bolt feeder includes: a rotating plate (12) arranged adjacent to a hopper (27) storing bolts (10); one or more magnets (15) to attract the bolts (10), from a back surface of the rotating plate (12), onto a front surface of the rotating plate (12); a selection block (13) having a gap space (13a) through which one bolt in a predetermined orientation out of the bolts (10) attracted by the one or more magnets (15) is allowed to pass; a motor (26) to cause the one or more magnets (15) to rotate and move from the hopper (27) toward the selection block (13); and a guide plate (29) extending upstream in a moving direction of the one or more magnets (15) from an entrance of the gap space (13a), and guiding the bolts (10) attracted by the one or more magnets (15) to the gap space (13a).

6 Claims, 8 Drawing Sheets

(58) Field of Classification Search
USPC .................................................. 198/384, 392
See application file for complete search history.

(56) References Cited

U.S. PATENT DOCUMENTS

| | | | | |
|---|---|---|---|---|
| 4,682,683 A * | 7/1987 | Ackley, Sr. | ........ | B65G 47/1471 |
| | | | | 198/380 |
| 5,913,402 A * | 6/1999 | Miura | ................ | B65G 47/1485 |
| | | | | 198/690.1 |
| 6,374,986 B1 * | 4/2002 | Oe | ..................... | H05K 13/0417 |
| | | | | 198/396 |
| 6,945,384 B2 * | 9/2005 | Sakota | ............... | B65G 47/1485 |
| | | | | 198/690.1 |

FOREIGN PATENT DOCUMENTS

| JP | 7-13829 U1 | 3/1995 |
|---|---|---|
| JP | 2000-289839 A | 10/2000 |
| JP | 3117662 B2 | 12/2000 |

* cited by examiner

BOLT FEEDER

CROSS-REFERENCE TO RELATED APPLICATION

This application is a U.S. National Stage Application under 35 U.S.C § 371 of International Patent Application No. PCT/JP2021/013263 filed Mar. 29, 2021, which claims the benefit of priority to Japanese Patent Application No. 2020-084230 filed May 13, 2020, the disclosures of all of which are hereby incorporated by reference in their entities.

TECHNICAL FIELD

The present invention relates to a bolt feeder which aligns and feeds bolts in a predetermined orientation, to be used in a welding station or the like.

BACKGROUND ART

When bolts are used in a welding station, for example, the bolts have to be aligned one by one in a predetermined orientation so as to be fed to the welding station. A bolt feeder required for this processing includes a selection block 13A in a rectangular parallelepiped shape, as shown in FIG. 12. The selection block 13A has a gap space 13aA wide enough for threaded portions 10b of bolts 10 to pass through one by one. The gap space 13aA is formed through the selection block 13A from a front surface to a rear surface thereof in a feed direction of the bolts 10.

The selection block 13A faces a rotating plate 12A in a disk shape at a lower portion thereof, via a gap. The gap has a dimension slightly larger than a thickness of a head 10a of the bolt 10. When the threaded portion 10b of the bolt 10 enters the gap space 13aA upright with respect to the rotating plate 12A, the head 10a can enter the gap.

The rotating plate 12A rotates in a direction indicated by an arrow toward an entrance of the gap space 13aA, and one or more magnets (not shown) are arranged on a back surface of the rotating plate 12A. With the one or more magnets, the bolts 10 stored in a hopper (not shown) are attracted in small numbers. When the rotating plate 12A rotates, the bolts 10 in the hopper are attracted by the one or more magnets and conveyed to the gap space 13aA. Only one bolt, with the head 10a facing the rotating plate 12A and the threaded portion 10b in an upright orientation, out of the conveyed bolts 10 passes through the selection block 13A. Specifically, the bolt 10 is moved, with the threaded portion 10b inserted in the gap space 13aA, in an upright orientation, and the head 10a inserted in the gap. The bolts 10 attracted in other orientations are blocked by the selection block 13A and fall into the hopper (not shown). In the same manner, the other bolts 10 are sequentially inserted and moved one by one.

Thus, the bolts 10 are sequentially inserted into the selection block 13A one by one in the predetermined orientation and moved, and are then fed to the welding station (not shown) through a shoot rail 14A. Patent Document 1 discloses such a conventional technique as described above.

CITATION LIST

Patent Document 1

Patent Document 1: Japanese Patent NO. 3117662

SUMMARY OF THE INVENTION

Problems to be Solved

However, the bolts 10 are attracted by the one or more magnets on the rotating plate 12A and conveyed so that the bolts 10 may be densely attracted and conveyed. In this case, when the bolts 10 are conveyed to the gap space 13aA of the selection block 13A in a concentrated manner, the bolts 10 may be tangled with each other and stuck in the entrance of the gap space 13aA, as shown in FIG. 12. As one example of sticking, the threaded portion 10b of the bolt 10 in a laid-down orientation is inserted into the gap space of the selection block 13A, and another bolt 10 is caught between said bolt 10 and a wall surface 29a of a guide plate 29. In this case, an operator has to release the sticking of the bolts 10, resulted in a problem such as a lower yield rate.

The present invention is intended to solve the problem described above and to provide a bolt feeder which aligns bolts one by one in a predetermined orientation, without being stuck, and feeds the bolts to a subsequent station.

Solution to Problem

To solve the problem described above, a bolt feeder according to the present invention is one to align bolts in a predetermined orientation and feed the bolts to a subsequent station, including: a storage portion storing the bolts therein; a plate-shaped body arranged adjacent to the storage portion; one or more magnets placed on a back surface of the plate-shaped body to attract the bolts via the plate-shaped body; a selection portion arranged on a front surface of the plate-shaped body and having a passage through which one bolt in a predetermined orientation out of the bolts attracted by the one or more magnets is allowed to pass; a moving device causing the one or more magnets, or the one or more magnets and the plate-shaped body, to rotate and move from the storage portion toward the selection portion; and a guide portion arranged on the front surface of the plate-shaped body, extending upstream in a moving direction of the one or more magnets from an entrance of the passage, and guiding the bolts attracted by the one or more magnets to the passage, wherein the guide portion has an inclined surface around the entrance of the passage, and the inclined surface is formed such that the more a position on the inclined surface is located away from a rotation center of the one or more magnets, the more the position is away from the front surface of the plate-shaped body.

Advantageous Effects of the Invention

According to the present invention, bolts can be aligned one by one in a predetermined orientation, without being stuck, and fed to a subsequent station.

DETAILED DESCRIPTION OF EMBODIMENTS

Configuration of Embodiment

Figure 1:
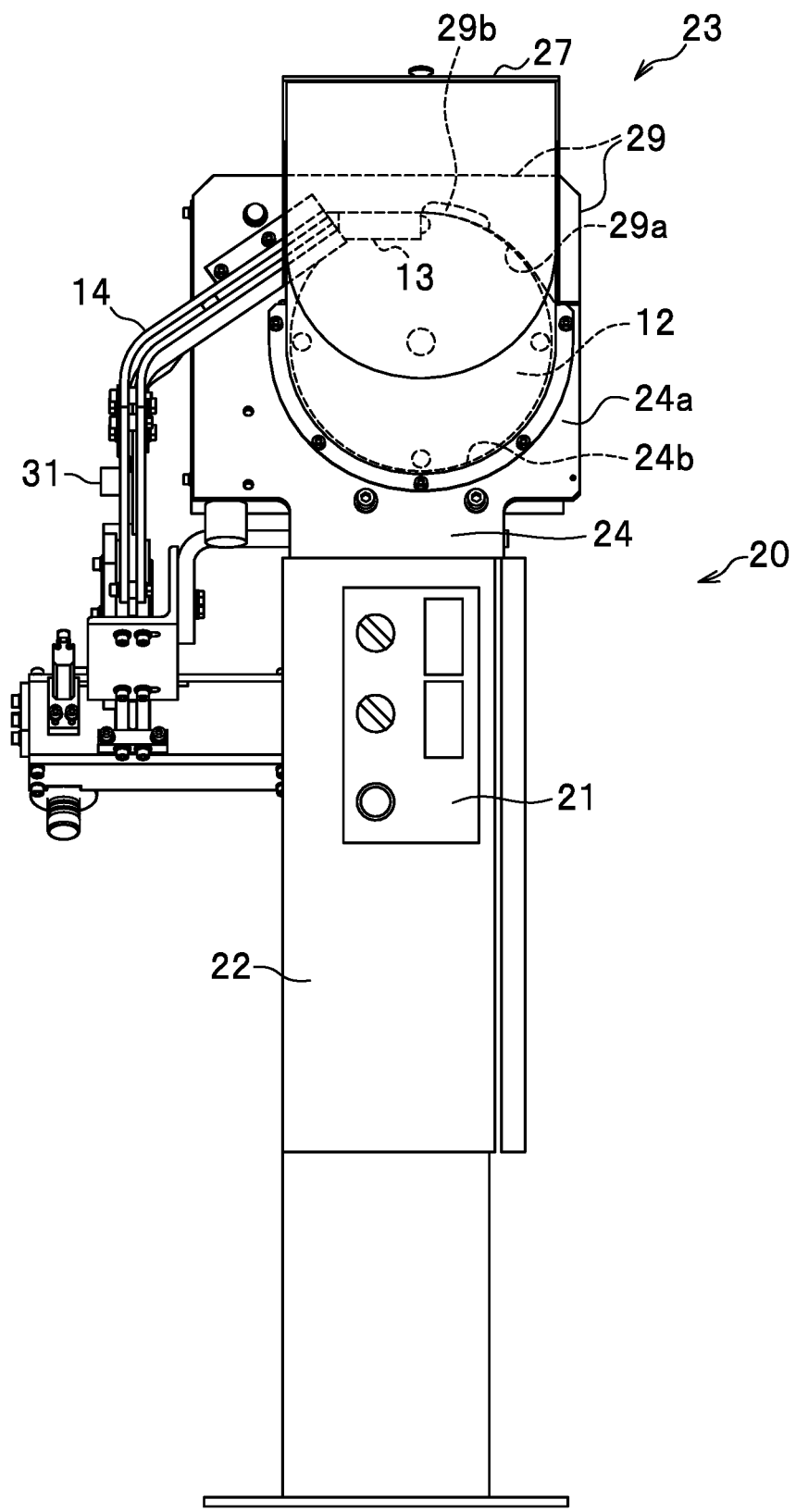
FIG. 1 is a front view of a bolt feeder according to an embodiment of the present invention.

Hereinbelow, a description is given of an embodiment of the present invention with reference to drawings. FIG. 1 is a front view of a bolt feeder, and FIG. 2 is a side view of the bolt feeder, according to an embodiment of the present invention.

A bolt feeder 20 in FIG. 1 includes a control board 22 having a control panel 21 and arranged vertically on a floor, and a bolt feeding part 23 arranged on the control board 22.

Figure 2:
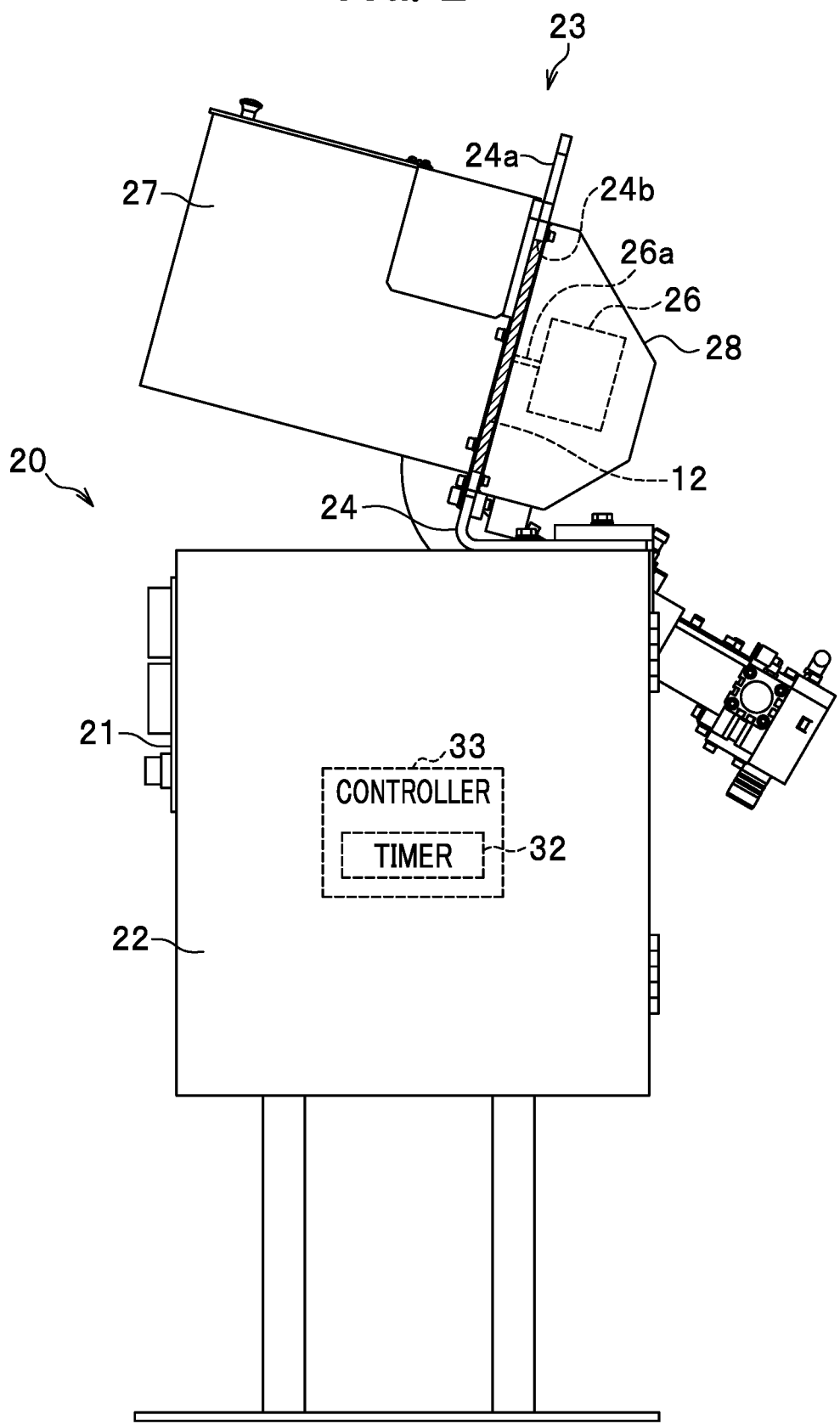
FIG. 2 is a partial cross-sectional side view of the bolt feeder.

As shown in FIG. 2, the bolt feeding part 23 includes a base 24 in an L-shape in a side view, having an inclined plate 24*a* formed with a circular opening 24*b* (see FIG. 1) therein, a rotating plate 12 in a disk shape (plate-shaped body) rotatably assembled at the circular opening 24*b*, and a motor (moving device) 26 with a rotating shaft 26*a* fixed in the center of the rotating plate 12. The motor 26 is covered by a motor cover 28.

Figure 3:
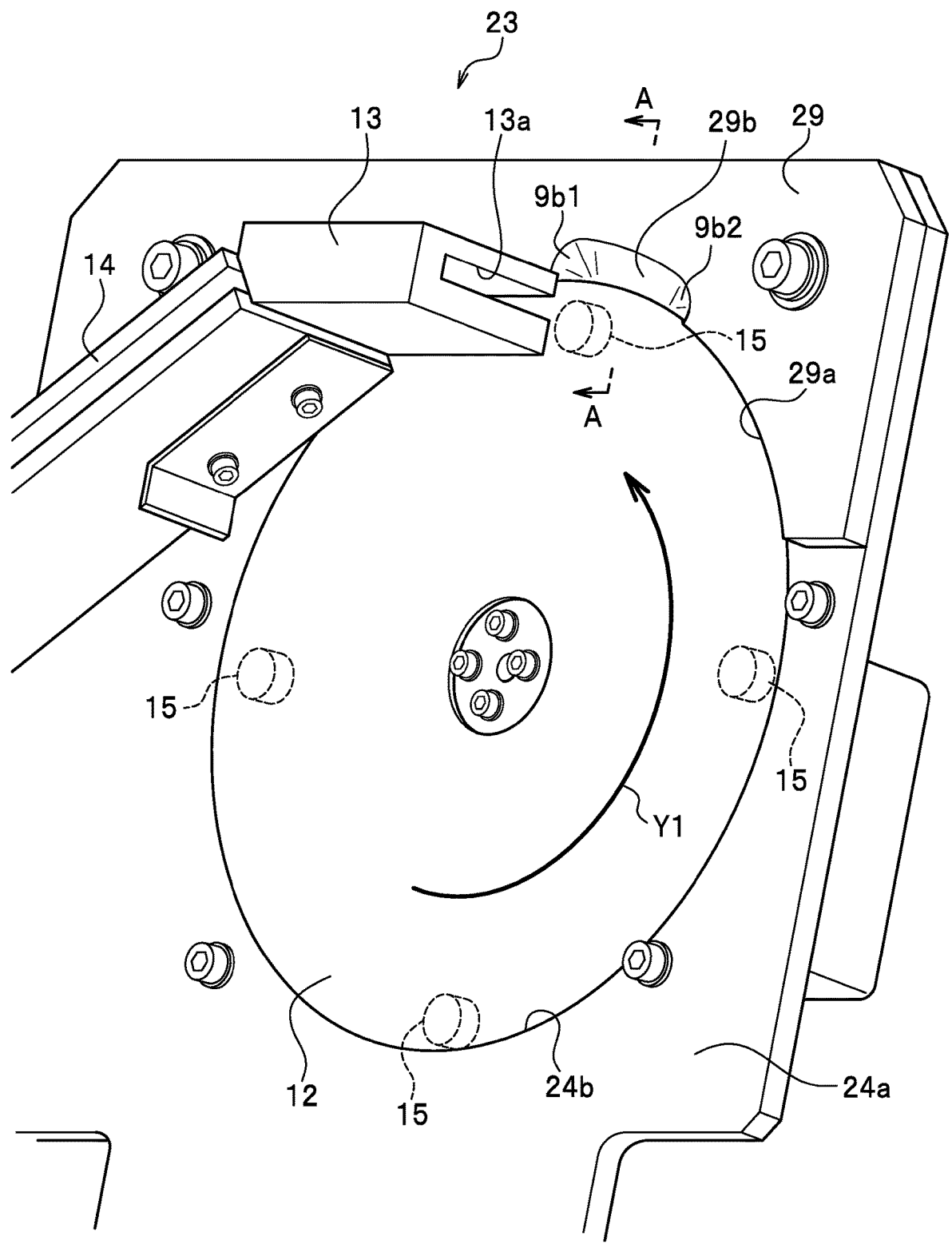
FIG. 3 is a perspective view of the bolt feeder to show an inclined surface of a guide plate and a surrounding structure thereof.

Further, the bolt feeding part 23 includes a hopper (storage portion) 27 arranged on a part of the inclined plate 24*a*, closer to the control panel 21, so as to protrude upward at an angle with respect to the inclined plate 24*a*, a shoot rail 14 protruding laterally downward from the base 24 and further extending downward, as shown in FIG. 1, and a proximity sensor 31 attached to the shoot rail 14. Furthermore, the bolt feeding part 23 includes, as shown in FIG. 3, a selection block (selection portion) 13 in a rectangular parallelepiped shape connected to the uppermost portion of the shoot rail 14, and a guide plate (guide portion) 29 fixed to the inclined plate 24*a*. Note that the proximity sensor 31 is a sensor in the appended one or more claims.

Figure 4:
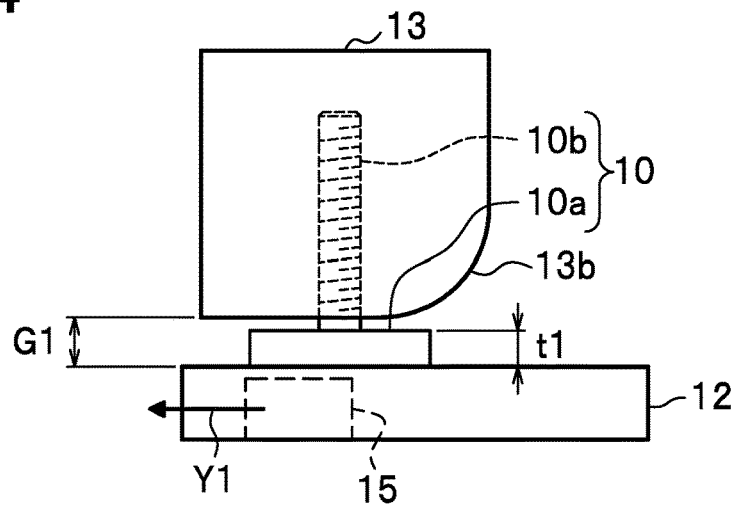
FIG. 4 is a side view of a selection block, across a gap, and an upright bolt on a rotating plate.

The selection block 13 has a gap space (passage) 13*a* through which the bolts 10 pass. The selection block 13 has the gap space 13*a* formed therethrough from a front surface (or surface facing the bolts) thereof to a rear surface thereof in a feeding direction of the bolts 10. Further, the gap space 13*a* has a dimension wide enough for one or more threaded portions 10*b* of the bolts 10 passing through one by one, or one after another, as shown in FIG. 4. The rotating plate 12 is arranged below the gap space 13*a* and the selection block 13, across a gap (interval) G1.

The gap G1 has a dimension slightly larger than a thickness t1 of a head 10*a* of the bolt 10. That is, when the threaded portion 10*b* of the single bolt 10 enters the gap space 13*a*, in an upright orientation allowed to pass through, the head 10*a* enters the gap G, in an orientation allowed to pass through.

As indicated by an arrow Y1 in FIG. 3, the rotating plate 12 rotates toward an entrance of the gap space 13*a*, and magnets 15 are placed on a periphery of a back surface of the rotating plate 12 at angular intervals of 90 degrees. However, one or more magnets 15 may be placed at one or more positions on the back surface to pass across the gap space 13*a* via the rotating plate 12 and the gap G, when rotated. Some of a large number of bolts 10 stored in the hopper 27 are attracted by the magnets 15 on a front surface of the rotating plate 12 and conveyed to the gap space 13*a*.

Figure 5:
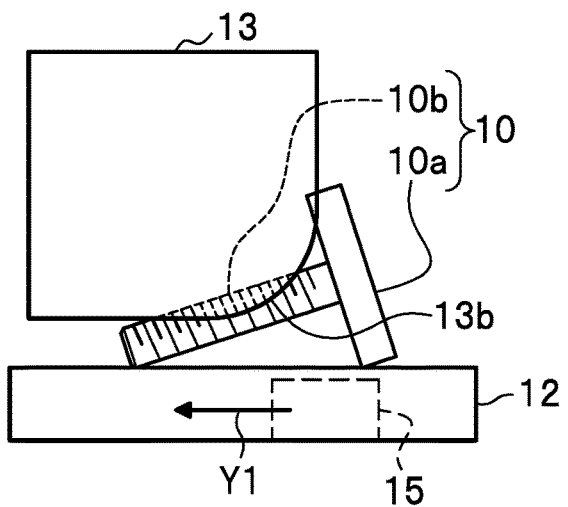
FIG. 5 is a side view of the selection block, across the gap, and a bolt on the rotating plate, with a threaded portion laid down.

As shown in FIG. 4, lower corners 13*b* on a front side of the selection block 13 each have a rounded shape in a side view. The lower corners 13*b* in a rounded shape (rounded lower corners) serve to raise the threaded portion 10*b* of the laid-down bolt 10 so as to stand upright. For example, as shown in FIG. 5, when the threaded portion 10*b* of the laid-down bolt 10 attracted by the magnet 15 on the rotating plate 12 enters the gap space 13*a* and the gap G1, the head 10*a* is in contact with the front surface of the selection block 13 and the rotating plate 12 at an angle.

Figure 6:
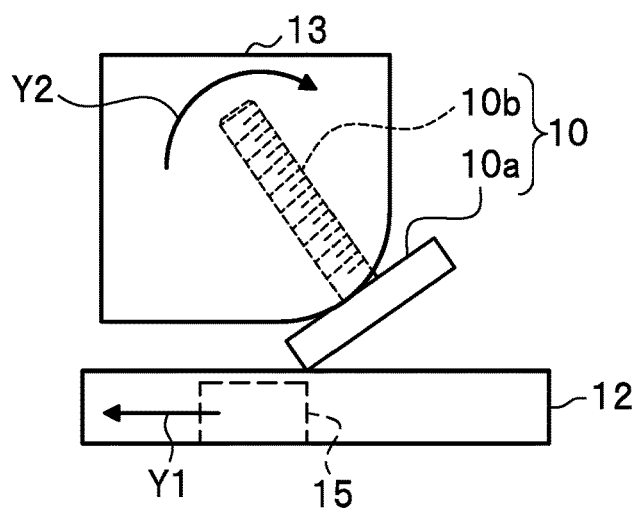
FIG. 6 is a side view of the selection block, across the gap, and a bolt on the rotating plate, with the threaded portion being raised.

In this state, when the rotating plate 12 further rotates in the direction of the arrow Y1, the head 10*a* of the bolt 10 moves in the direction of the arrow Y1 while being in contact with the rounded lower corners 13*b*, as shown in FIG. 6. In this movement, a leading end in a moving direction of the head 10*a* moves into the gap G1 and a trailing end of the head 10*a* moves to come closer to the rotating plate 12. Therefore, the threaded portion 10*b* protruding from the head 10*a* moves toward an upright orientation as indicated by an arrow Y2.

As the bolts 10 further moves, the threaded portion 10*b* of the bolt 10 stands upright, and the head 10*a* is in an orientation to enter the gap G1, as shown in FIG. 4. In this way, the bolts 10 are inserted and moved into the space 13*a* of the selection block 13 one by one in a predetermined orientation and are fed to a subsequent station through the shoot rail 14 in FIG. 3. The shoot rail 14 is connected, at the uppermost portion thereof, to the rear surface of the gap space 13*a* of the selection block 13, protrudes laterally downward of the base 24 from the connected portion, and further extends downward, as shown in FIG. 1. Therefore, the bolts 10 having passed through the gap space 13*a* freely fall through the shoot rail 14.

Next, the guide plate 29 shown in FIG. 3 is arranged along the outer periphery of the rotating plate 12 on the entrance side (front side) of the gap space 13*a* of the selection block 13. The guide plate 29 serves to guide the bolts 10 (see FIG. 8), which are attracted by the one or more magnets 15 on the rotating plate 12, to the gap space 13*a*. For the guiding, the guide plate 29 has a curved end-surface 29*a* which is a wall surface having a predetermined height and extending in a curve along the outer periphery of the rotating plate 12. The curved end-surface 29*a* is the wall surface perpendicular to or nearly perpendicular to the plane of the rotating plate 12.

Figure 7:
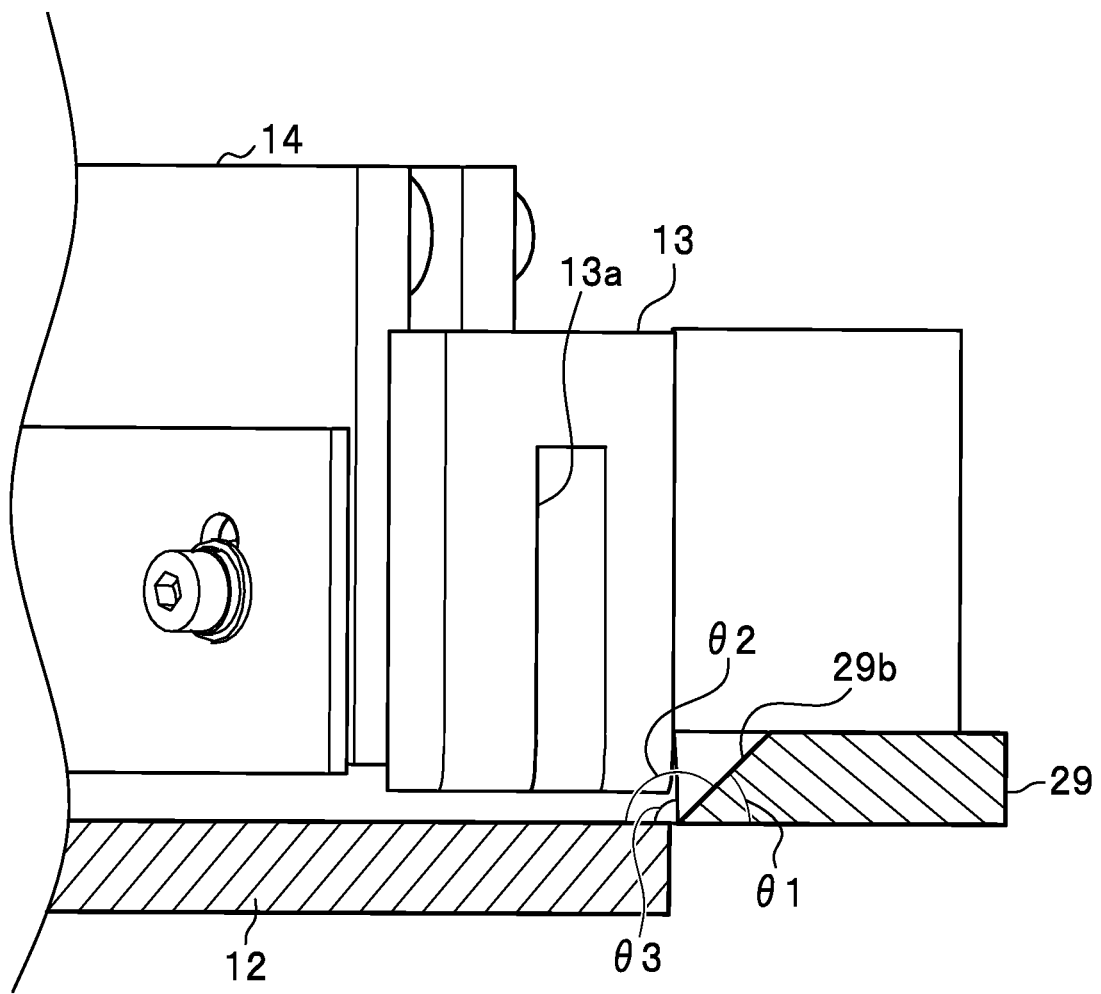
FIG. 7 is a cross-sectional view, taken along a line A-A in FIG. 3.

FIG. 7 is a cross-sectional view, taken along a line A-A in FIG. 3. As shown in FIG. 7, the curved end-surface 29*a* has an inclined surface 29*b* which inclines upward at a predetermined angle θ1 from the plane of the rotating plate 12 toward a direction perpendicular to (intersecting) the curved end-surface 29*a*, around the entrance of the gap space 13*a*. In other words, the inclined surface 29*b* is inclined such that the more a position on the inclined surface 29*b* is located away from a rotation center of the one or more magnets 15

(outward in the radial direction), the more the position is away from (in a direction normal to) the front surface of the rotating plate 12. The angle θ1 is set at an angle of less than 90 degrees with respect to the back surface of the guide plate 29, which is flush with the plane of the rotating plate 12. In the present example, the angle θ1 is set to 45 degrees.

The inclined surface 29b has, as shown in FIG. 3, a rounded surface 9b1 formed in a rounded shape at a portion thereof closer to the entrance of the gap space 13a, and a similar rounded surface 9b2 on the opposite side. That is, the inclined surface 29b has the rounded surfaces 9b1 and 9b2 at both ends thereof, which are continuous to the inclined surface. In this structure, the rounded surface 9b1 is formed at the entrance of the gap space 13a, to facilitate the bolts 10 changing orientations and escaping by the rounded surface 9b1. Therefore, even when the bolts 10 are conveyed to the entrance of the gap space 13a in a concentrated manner, the bolts 10 other than that inserted into the gap space 13a can have orientations thereof changed and escaped by the rounded surface 9b1.

Note that, the inclined surface 29b may have only the rounded surface 9b1, closer to the entrance of the gap space 13a, of the rounded surfaces 9b1 and 9b2 at both ends. Further, the rounded surfaces 9b1 and 9b2 at both ends may each have a right-angled shape or any other polyangular shape.

Thus, when the curved end-surface 29a has the inclined surface 29b, an angle θ2 between the inclined surface 29b and the plane of the rotating plate 12 (also called a rotation plane) is an obtuse angle larger than an angle θ3 (90 degrees) between the vertical curved end-surface 29a and the rotation plane, as shown in FIG. 7. In the present embodiment, the obtuse angle θ2 is 135 degrees, which is the sum of 90 degrees of the angle θ3 and 45 degrees of the angle θ1.

Figure 8:
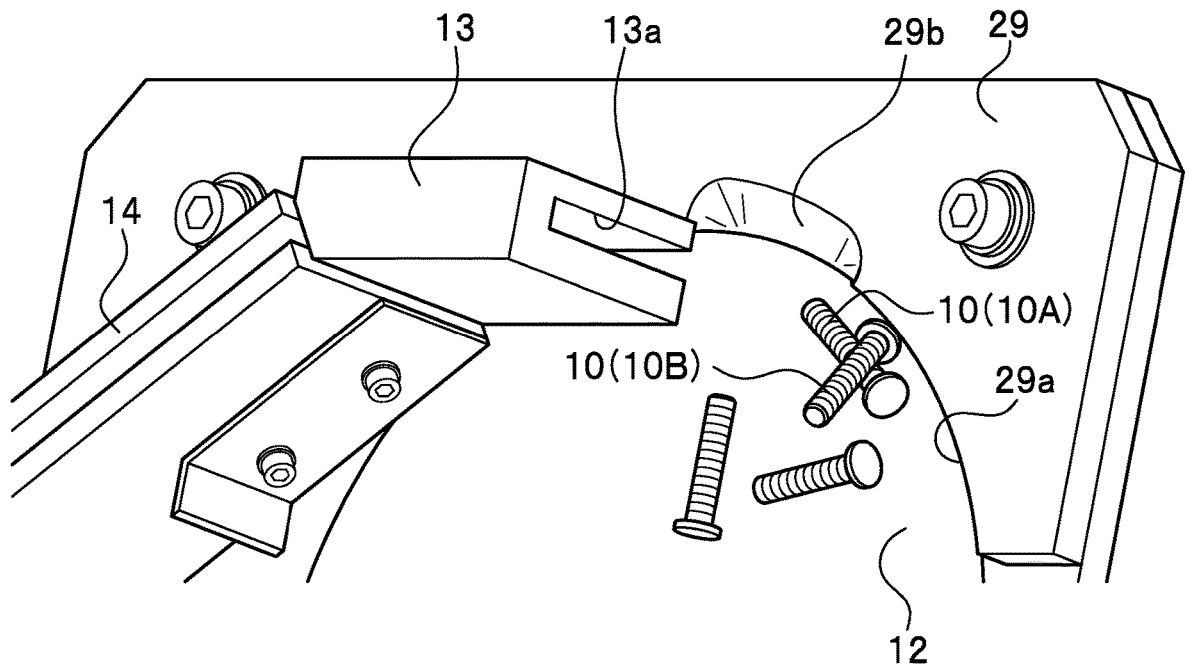
FIG. 8 is a perspective view of bolts attracted by one or more magnets on the rotating plate.
Figure 9:
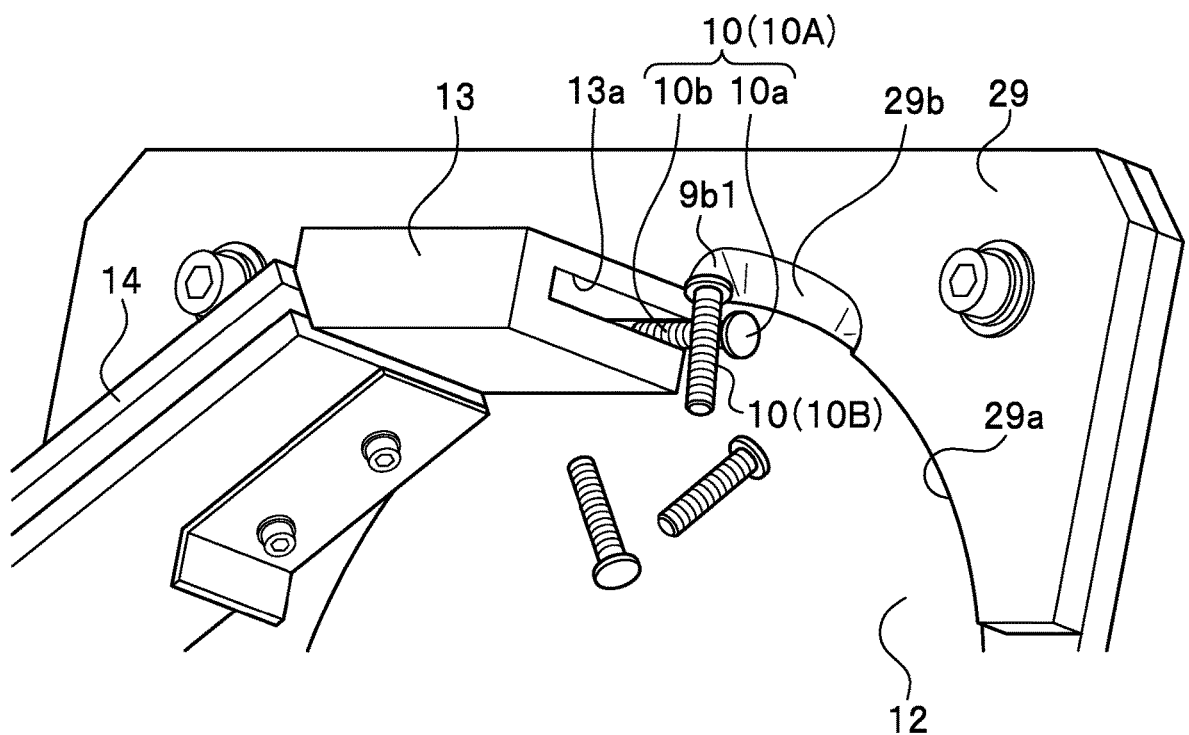
FIG. 9 is a perspective view of a bolt, with a threaded portion entered a gap space in the selection block, tangled with another bolt.

This defines an obtuse-angled opening open at an angle of 135 degrees around the entrance of the gap space 13a, to facilitate the bolts 10 gathered around the entrance easily being ejected away from the entrance through the obtuse-angled opening. For example, when an inverted bolt 10B interposed between a laid-down bolt 10A and the curved end-surface 29a is conveyed, as shown in FIG. 8, the threaded portion 10b of the bolt 10A is inserted into the gap space 13a and the other bolt 10B is moved upward along the inclined surface 29b, as shown in FIG. 9. Accordingly, the other bolt 10B is ejected away from the entrance of the gap space 13a, without being held between the bolt 10A and the inclined surface 29b.

Further, as shown in FIG. 3, the rounded surface 9b1 is formed in the inclined surface 29b at the entrance of the gap space 13a, so that even when the bolts 10 are conveyed in a concentrated manner at the entrance of the gap space 13a, most of the bolts 10 are changed in orientation by the rounded surface 9b1 and are easily ejected.

Figure 11:
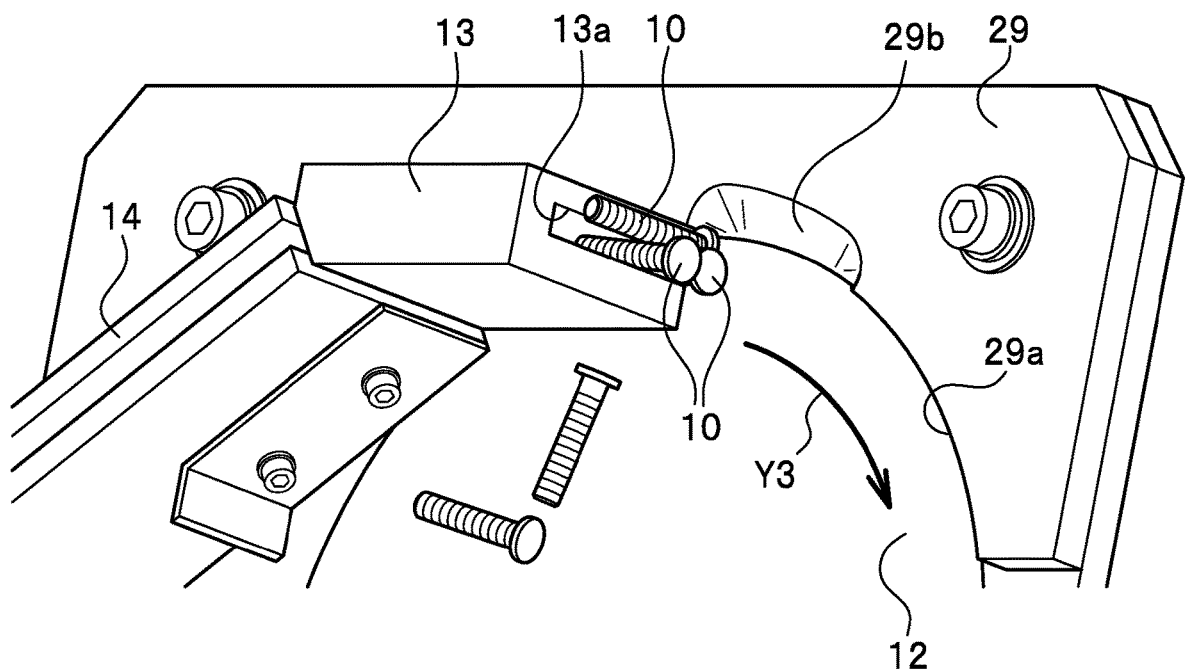
FIG. 11 is a perspective view of bolts, with threaded portions entered the gap space of the selection block and stuck; and, FIG. 12 is a perspective view of main parts of a conventional bolt feeder.
Figure 12:
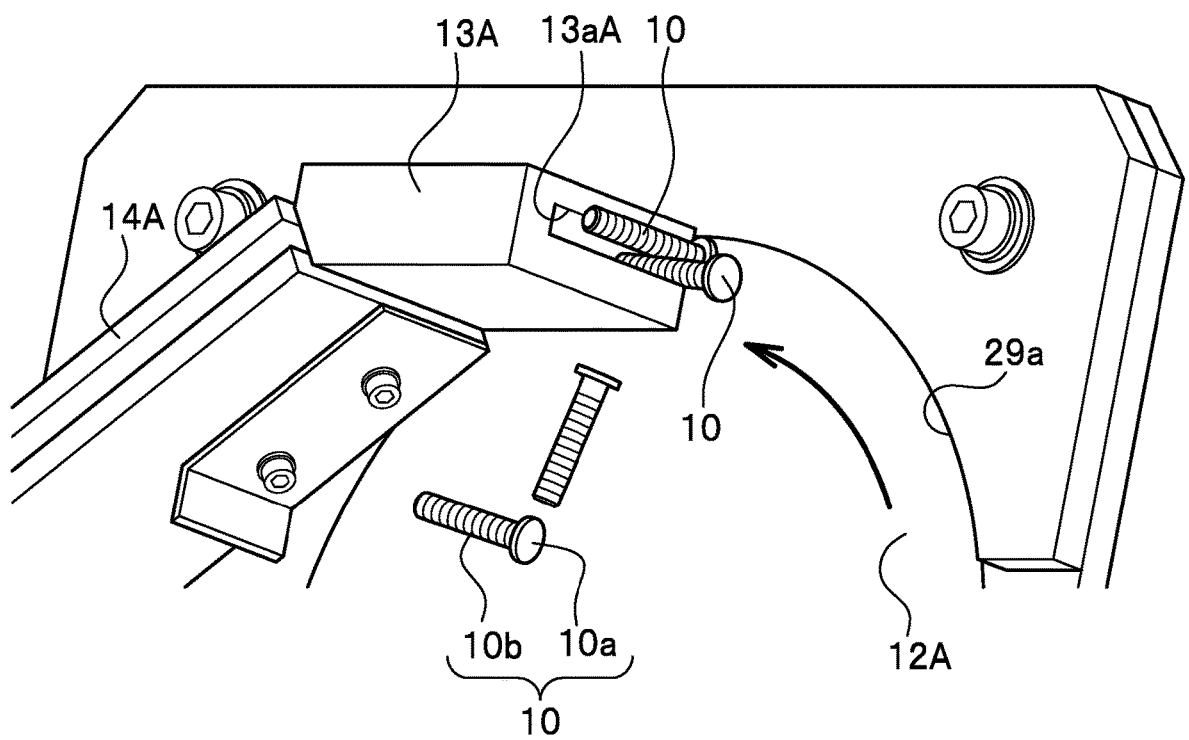

Next, as shown in FIG. 11, a description is given of a structure to rotate the rotating plate 12 reversely in a direction of an arrow Y3 when the bolts 10 are stuck in the gap space 13a.

The structure includes the proximity sensor 31 in FIG. 1, the motor 26 in FIG. 2 which causes the rotating plate 12 to rotate forward (in the direction of the arrow Y1 in FIG. 3) or reversely, and a controller 33 with a timer 32. The proximity sensor 31, the timer 32, the controller 33, and the motor 26 are electrically connected with each other.

The proximity sensor 31 detects the bolt 10 made of metal passing through the shoot rail 14 and outputs a detection signal to the timer 32. The timer resets timing operation when the detection signal is inputted to perform the timing operation again. In a case where no detection signal is inputted to the timer 32, the timing operation continues. When the timing operation has elapsed a predetermined first setting time, the timer 32 outputs a no-detection signal, indicating that the bolt 10 has not been detected, to the controller 33.

In other words, the timer 32 measures time of the bolt 10 not being detected by the proximity sensor 31 and outputs the no-detection signal to the controller 33 when the time of the bolts 10 not being detected has elapsed the first setting time.

When start-up operation is performed with the control panel 21, the controller 33 controls the motor 26 to rotate forward. During this controlling, when the no-detection signal is inputted from the timer 32, the controller 33 controls the motor 26 to rotate reversely. In other words, when the timing operation of the timer 32 has elapsed the first setting time, the controller 33 controls the motor 26 to rotate reversely. With this control, the motor 26 rotates reversely to cause the rotating plate 12 to rotate reversely (in the direction of the arrow Y3), so that the bolts 10 stuck in the gap space 13a shown in FIG. 11 are released.

Further, when a predetermined time (second setting time) elapses since the motor 26 has been controlled to rotate reversely, the controller 33 controls the motor 26 to rotate forward (in the opposite direction of the arrow Y3). The second setting time defines, by measurement or the like in advance, time for the bolts 10 stuck in the gap space 13a to be released by reverse rotation of the rotating plate 12. The second setting time is determined by the controller 33 with a built-in timer or measured by the timer 32 separately from the first setting time. Note that the second setting time is a setting time in the appended one or more claims.

Operation of Embodiment

Next, a description is given of feeding operation of the bolts 10 by the bolt feeder 20 described above. Note that a large number of bolts 10 is stored in the hopper 27.

First, when an operator performs the start-up operation with the control panel 21, the controller 33 controls the motor 26 to rotate forward, which, in turn, causes the rotating plate 12 to rotate forward by the motor 26 rotating forward. When the rotating plate 12 rotates forward, the bolts 10 attracted by the magnets 15 onto the front surface of the rotating plate 12 out of the bolts 10 in the hopper 27 are conveyed, as shown in FIG. 8, toward the gap space 13a of the selection block 13.

Then, when the bolts 10 are conveyed, as shown in FIG. 9, simultaneously to the entrance of the gap space 13a in a concentrated manner, the threaded portion 10b of one of the bolts 10 may enter the gap space 13a and may be tangled with the threaded portion 10b of the other bolt 10 at the entrance of the gap space. The head 10a of the other bolt 10 is located on the rounded surface 9b1 of the inclined surface 29b. Therefore, when the rotating plate 12 further rotates forward, the other bolt 10 is moved away laterally with respect to the gap space 13a from the obtuse-angled opening defined by the rounded surface 9b1.

After the other bolt is moved away, the bolt 10 with the threaded portion 10b in the gap space 13a is in an orientation shown in FIG. 5, by movement of forward rotation of the rotating plate 12. That is, the head 10a stands at an angle between the front surface of the selection block 13 and the rotating plate 12, with the laid-down threaded portion 10b in the gap space 13a and the gap G1.

Then, when the rotating plate 12 further rotates forward, as shown in FIG. 6, the head 10*a* of the bolt 10 moves in the direction indicated by the arrow Y1 while being in contact with the rounded lower corners 13*b*, to cause the threaded portion 10*b* protruding from the head 10*a* to move toward the direction for upright orientation indicated by the arrow Y2.

Figure 10:
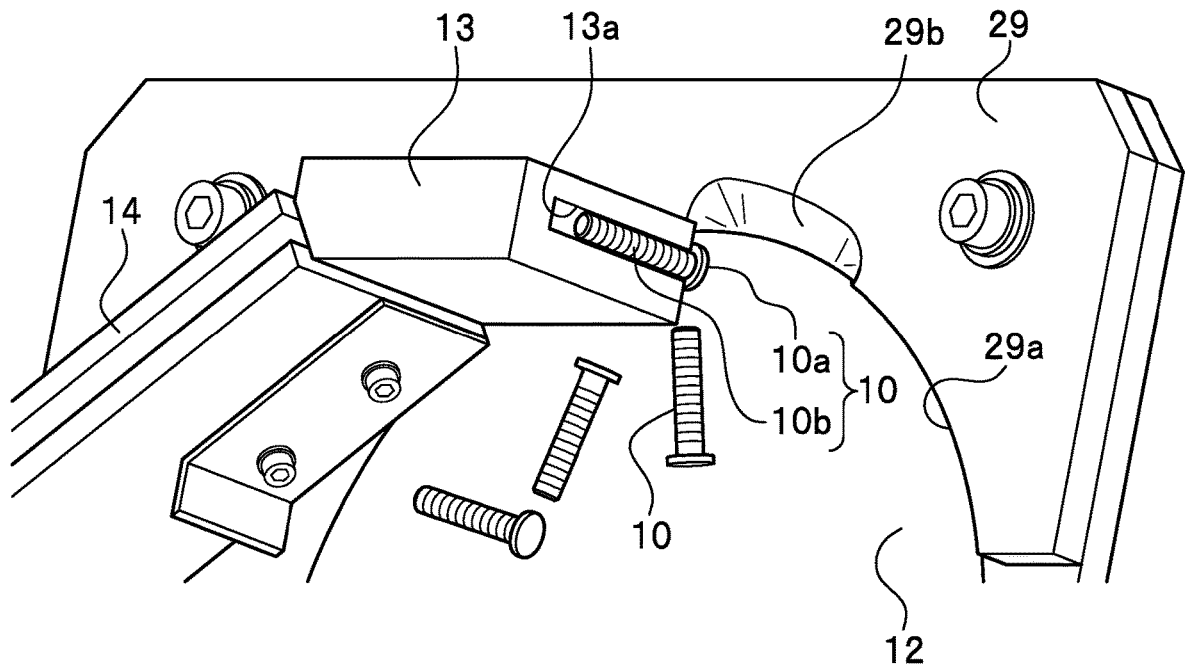
FIG. 10 is a perspective view of a bolt, with an upright threaded portion entered the gap space of the selection block.

When the bolt 10 further moves, as shown in FIG. 10, the threaded portion 10*b* of the bolt 10 stands upright and the head 10*a* is in an orientation to enter the gap G1. The bolt 10 in this orientation passes through the gap space 13*a*, moves along the shoot rail 14 in free fall, and is fed to a subsequent station. Then, the bolts 10 sequentially pass through the gap space 13*a* one by one in a predetermined orientation and are fed to the subsequent station through the shoot rail 14 in a same manner.

In contrast, even when the rotating plate 12 rotates forward, the bolts 10 may be stuck in the gap space 13*a*, as shown in FIG. 11, one of the bolts 10 cannot pass through the gap space 13*a* and cannot move along the shoot rail 14. Therefore, the proximity sensor 31 does not detect the bolt 10 and a detection signal is not outputted to the timer 32.

At this time, the timer 32 is not inputted with the detection signal and continues timing operation. When the timing operation has elapsed the first setting time, the timer 32 outputs a no-detection signal to the controller 33. When the no-detection signal is inputted, the controller 33 controls the motor 26 to rotate reversely. With this control, the motor 26 rotates reversely to cause the rotating plate 12 to rotate reversely, to move away the bolts 10 stuck in the gap space 13*a* shown in FIG. 11.

Then, when the second setting time elapses since the above-mentioned reverse rotation control has been performed, the controller 33 controls the motor 26 to rotate forward. With this control, the motor 26 rotates forward and the rotating plate 12 rotates forward, so that the bolts 10 attracted by the one or more magnets 15 on the rotating plate 12 sequentially pass through the gap space 13*a* one by one in a predetermined orientation and are fed through the shoot rail 14 to the subsequent station.

Advantageous Effects of Embodiment

As described above, the bolt feeder 20 of the present embodiment aligns and feeds the bolts 10 one by one in a predetermined orientation to a subsequent station, to have following features.

(i) The bolt feeder 20 includes: the hopper 27 storing the bolts 10 therein; the rotating plate 12 arranged adjacent to the hopper 27; the one or more magnets 15 placed on the back surface of the rotating plate 12 to attract the bolts 10 via the rotating plate 12; and the selection block 13 arranged on the front surface of the rotating plate 12 and having the gap space 13*a* through which the bolt 10 in a predetermined orientation out of the bolts 10 attracted by the one or more magnets 15 is allowed to pass.

Further, the bolt feeder 20 includes: the motor 26 causing the one or more magnets 15 and the rotating plate 12 to rotate and move from the hopper 27 toward the selection block 13; and the guide plate 29 arranged on the front surface of the rotating plate 12, extending upstream in the moving direction of the one or more magnets 15 from the entrance of the gap space 13*a*, and guiding the bolts 10 attracted by the one or more magnets 15 to the gap space 13*a*.

The guide plate 29 has the inclined surface 29*b* around the entrance of the gap space 13*a*, and the inclined surface 29*b* is formed such that the more a position on the inclined surface 29*b* is located away from the rotation center of the one or more magnets 15 (outward in the radial direction), the more the position is away from the front surface of the rotating plate 12 (in the direction normal to the front surface).

With the structure, the following advantageous effects are obtained. The curved end-surface 29*a* has the inclined surface 29*b*, which inclines upward from the plane of the rotating plate 12 toward a direction intersecting the curved end-surface 29*a*, around the entrance of the gap space 13*a*. The upward inclination of the inclined surface 29*b* is set to the angle θ1 (45 degrees) as shown in FIG. 7 with respect to the back surface of the inclined surface 29*b* which is flush with the plane of the rotating plate 12, for example. Also, the angle θ2 between the inclined surface 29*b* and the plane of the rotating plate 12 (rotation plane) is set to the obtuse angle (90 degrees+45 degrees=135 degrees) larger than the angle θ3 (90 degrees) between the curved end-surface 29*a* and the rotation plane. Therefore, the obtuse-angled opening having the angle θ2 is defined around the entrance of the gap space 13*a*.

In a conventional art, an opening corresponding to the obtuse-angled opening is set to an angle of only 90 degrees between the rotation plane and the curved end-surface 29*a*, and both the curved end-surface 29*a*, defining the opening at the angle of 90 degrees, and vertical wall surfaces in the opening of the gap space 13*a* are close to each other and upright with respect to the rotating plate 12, so that the bolts 10 are easily caught and stuck between the two.

In contrast, in the present invention, the obtuse-angled opening at the angle of 135 degrees, which exceeds the angle θ3 of 90 degrees, is widely opened between the rotation plane and the inclined surface 29*b*. That is, a distance between the vertical wall surfaces in the opening of the gap space 13*a* and the inclined surface 29*b* is increased. This allows the bolts 10, conveyed to the entrance of the gap space 13*a* in a concentrated manner, to be moved away from the obtuse-angled opening outward around the entrance. Therefore, the bolts 10 are not stuck so that the bolts 10 conveyed to the gap space 13*a* are aligned one by one in a predetermined orientation, without being stuck, and fed to a subsequent station.

(ii) The bolt feeder 20 includes: the hopper 27 storing the bolts 10 therein; the rotating plate 12 arranged adjacent to the hopper 27; the one or more magnets 15 arranged on the back surface of the rotating plate 12 to attract the bolts 10 via the rotating plate 12; and the selection block 13 arranged on the front surface of the rotating plate 12 and having the gap space 13*a* through which the bolt 10 in a predetermined orientation out of the bolts 10 attracted by the one or more magnets 15 is allowed to pass.

Further, the bolt feeder 20 includes: the motor 26 causing the one or more magnets 15 and the rotating plate 12 to rotate and move from the hopper 27 toward the selection block 13; and the guide plate 29 arranged on the front surface of the rotating plate 12, extending upstream in the moving direction of the one or more magnets 15 from the entrance of the gap space 13*a*, and guiding the bolts 10 attracted by the one or more magnets 15 to the gap space 13*a*.

Still further, the bolt feeder 20 includes: the proximity sensor 31 which detects the bolt 10 having passed through the selection block 13; and the controller 33 which controls the motor 26 as a moving device to rotate reversely when the proximity sensor 31 does not detect the bolt 10 for a predetermined time.

With the structure, as shown in FIG. 11, in a case where the rotating plate 12 rotates forward (in the opposite direction of the arrow Y3) but the bolts 10 are stuck in the gap space 13*a* and cannot pass through the gap space 13*a*, the bolts 10 do not pass through the shoot rail 14. Therefore, if no bolt 10 is detected by the proximity sensor 31 for a predetermined time, the controller 33 controls the motor 26 to rotate reversely. With this control, the motor 26 rotates reversely to cause the rotating plate 12 to rotate reversely (in the direction of the arrow Y3), so that the bolts 10 stuck in the gap space 13*a* are released.

(iii) The bolt feeder 20 includes: the hopper 27 storing the bolts 10 therein; the rotating plate 12 arranged adjacent to the hopper 27; the one or more magnets 15 arranged on the back surface of the rotating plate 12 to attract the bolts 10 via the rotating plate 12; and the selection block 13 arranged on the front surface of the rotating plate 12 and having the gap space 13*a* through which the bolt 10 in a predetermined orientation out of the bolts 10 attracted by the one or more magnets 15 is allowed to pass.

Further, the bolt feeder 20 includes: the motor 26 causing the one or more magnets 15 and the rotating plate 12 to rotate and move from the hopper 27 toward the selection block 13; and the guide plate 29 arranged on the front surface of the rotating plate 12, extending upstream in the moving direction of the one or more magnets 15 from the entrance of the gap space 13*a*, and guiding the bolts 10 attracted by the one or more magnets 15 to the gap space 13*a*.

The guide plate 29 described above has the inclined surface 29*b* around the entrance of the gap space 13*a*, and the inclined surface 29*b* is formed such that the more a position on the inclined surface 29*b* is located away from the rotation center of the one or more magnets 15 (outward in the radial direction), the more the position is away from the front surface of the rotating plate 12 (in the direction normal to the front surface).

Still further, the bolt feeder 20 includes: the proximity sensor 31 which detects the bolt 10 having passed through the selection block 13; and the controller 33 which controls the motor 26 as a moving device to rotate reversely when the proximity sensor 31 does not detect the bolt 10 for a predetermined time.

With the structure, the same advantageous effects as (i) and (ii) described above are obtained.

(iv) When the setting time elapses since the controller 33 has controlled the motor 26 to rotate reversely, the controller 33 controls the motor 26 to rotate forward.

With the structure, the following advantageous effects are obtained. The setting time is set in advance to a time taken to release the bolts 10 stuck in the gap space 13*a* by reverse rotation of the rotating plate 12. When the motor 26 rotates reversely for the setting time, the bolts 10 stuck in the gap space 13*a* are released. When the setting time has elapsed, the controller 33 controls the motor 26 to rotate forward, to return to normal operation. The bolts 10 attracted by the one or more magnets 15 on the rotating plate 12 sequentially pass through the gap space 13*a* one by one in a predetermined orientation, and are fed through the shoot rail 14 to a subsequent station.

(v) The selection block 13 has a pair of walls arranged across a gap space (distance) 13*a* corresponding to the threaded portion 10*b* of the bolt 10, and the walls are arranged across the gap G1 corresponding to the head 10*a* of the bolt 10 with respect to the rotating plate 12. The wall has, at the end thereof closer to the rotating plate 12, a rounded shape (curved shape) in cross section when viewed radially from the rotation center of the one or more magnets 15.

With the structure, the following advantageous effects are obtained. As shown in FIG. 5, the laid-down threaded portion 10*b* of the bolt 10 may enter the gap space 13*a* of the selection block 13 and the gap G1, and the head 10*a* may stand at an angle between the front surface of the selection block 13 and the rotating plate 12.

With the bolt 10 in this orientation, when the rotating plate 12 further rotates in the direction indicated by the arrow Y1, as shown in FIG. 6, the head 10*a* moves in the gap G1 while being in contact with the rounded lower corners 13*b*, and the threaded portion 10*b* protruding from the head 10*a* stands up in the direction of the arrow Y2. When the rotating plate 12 rotates further, as shown in FIG. 4, the threaded portion 10*b* of the bolt 10 stands upright, and the head 10*a* is in an orientation to enter the gap G1. That is, even when the bolt 10, with the threaded portion 10*b* in a laid-down orientation, enters the gap space 13*a*, the bolt 10 in this orientation can be arranged in a predetermined orientation (the head 10*a* is down and the threaded portion 10 is upright) and pass through.

The present invention may be appropriately modified into other specific configurations within a scope of the present invention. Instead of the rotating plate 12, a plate-shaped body may be fixed and only the one or more magnets 15 may be rotated. Further, instead of the curved end-surface 29*a* of the guide plate 29, a non-curved wall surface may be used. The non-curved wall surface may be, for example, a straight wall surface inclined upward toward the selection block 13. In addition, instead of the shoot rail 14, a holder may be used to hold the aligned bolts 10.

REFERENCE SYMBOLS

9*b*1, 9*b*2: rounded surface; 10: bolt; 10*a*: threaded portion; 10*b*: head; 12: rotating plate; 13: selection block; 13*a*: gap space; 13*b*: rounded lower corner; 14: shoot rail; 15: magnet; 20: bolt feeder; 26: motor; 29: guide plate; 29*a*: curved end-surface; 29*b*: inclined surface; 31: proximity sensor; 32: timer; 33: controller.

The invention claimed is:

1. A bolt feeder to align bolts in a predetermined orientation and to feed the bolts to a subsequent station, comprising:
a storage portion storing the bolts therein;
a plate-shaped body arranged adjacent to the storage portion;
one or more magnets placed on a back surface of the plate-shaped body to attract the bolts via the plate-shaped body;
a selection portion arranged on a front surface of the plate-shaped body and having a passage through which one bolt in a predetermined orientation out of the bolts attracted by the one or more magnets is allowed to pass;
a moving device causing the one or more magnets, or the one or more magnets and the plate-shaped body, to rotate and move from the storage portion toward the selection portion; and
a guide portion arranged on the front surface of the plate-shaped body, extending upstream in a moving direction of the one or more magnets from an entrance of the passage, and guiding the bolts attracted by the one or more magnets to the passage, wherein
the guide portion has an inclined surface around the entrance of the passage, and the inclined surface is inclined upward and radially outward from an end of the front surface of the plate-shaped body.

2. The bolt feeder according to claim 1, wherein
the selection portion has a pair of walls arranged across a gap space corresponding to a threaded portion of the bolt,
the walls are arranged across a gap corresponding to a head of the bolt with respect to the plate-shaped body, and
the walls each have, at an end thereof closer to the plate-shaped body, a curved shape in cross section when viewed radially from a rotation center of the one or more magnets.

3. A bolt feeder to align bolts in a predetermined orientation and to feed the bolts to a subsequent station, comprising:
a storage portion storing the bolts therein;
a plate-shaped body arranged adjacent to the storage portion;
one or more magnets placed on a back surface of the plate-shaped body to attract the bolts via the plate-shaped body;
a selection portion arranged on a front surface of the plate-shaped body and having a passage through which one bolt in a predetermined orientation out of the bolts attracted by the one or more magnets is allowed to pass;
a moving device causing the one or more magnets, or the one or more magnets and the plate-shaped body, to rotate and move from the storage portion toward the selection portion; and
a guide portion arranged on the front surface of the plate-shaped body, extending upstream in a moving direction of the one or more magnet from an entrance of the passage, and guiding the bolts attracted by the one or more magnets to the passage, wherein
the guide portion has an inclined surface around the entrance of the passage,
the inclined surface is inclined upward and radially outward from an end of the front surface of the plate-shaped body, and
the bolt feeder further comprises:
a sensor to detect the bolt having passed through the selection portion; and
a controller to control the moving device to rotate reversely when the sensor does not detect the bolt in a predetermined time.

4. The bolt feeder according to claim 3, wherein, when a setting time set in advance elapses since the controller has controlled the moving device to rotate reversely, the controller controls the moving device to rotate forward.

5. The bolt feeder according to claim 4, wherein
the selection portion has a pair of walls arranged across a gap space corresponding to a threaded portion of the bolt,
the walls are arranged across a gap corresponding to a head of the bolt with respect to the plate-shaped body, and
the walls each have, at an end thereof closer to the plate-shaped body, a curved shape in cross section when viewed radially from a rotation center of the one or more magnets.

6. The bolt feeder according to claim 3, wherein
the selection portion has a pair of walls arranged across a gap space corresponding to a threaded portion of the bolt,
the walls are arranged across a gap corresponding to a head of the bolt with respect to the plate-shaped body, and
the walls each have, at an end thereof closer to the plate-shaped body, a curved shape in cross section when viewed radially from a rotation center of the one or more magnets.

\* \* \* \* \*